Patented Mar. 19, 1946

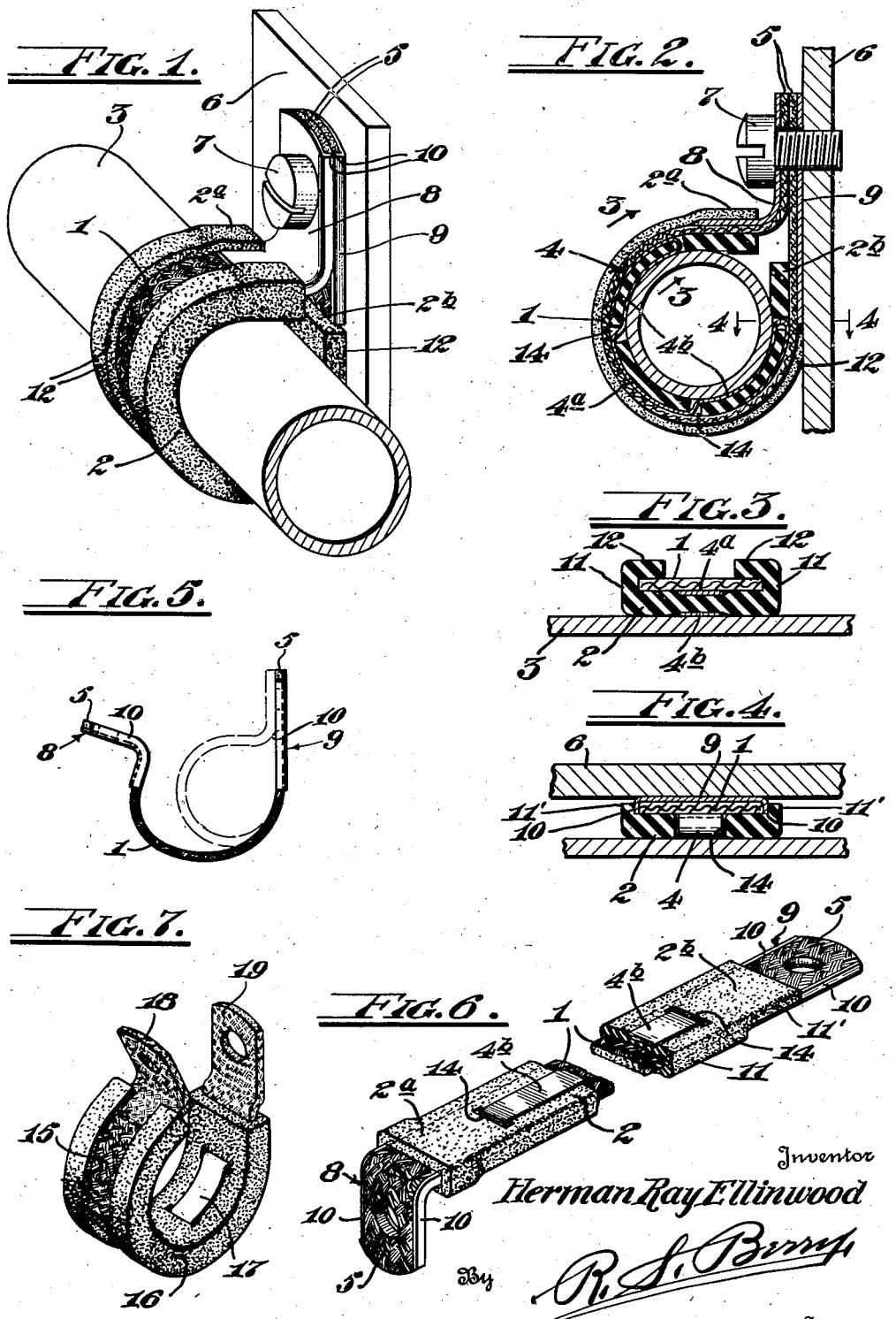

2,396,838

UNITED STATES PATENT OFFICE 2,396,838

LINE SUPPORTING CLIP

Herman Ray Ellinwood, Burbank, Calif., assignor to Adel Precision Products Corp., a corporation of California Application May 6, 1942, Serial No. 441,980

3 Claims. (Cl. 174—40)

This invention relates to clips or hangers for effecting a cushioned, vibration-damping and electrically bonded or "grounded" support of metal conduit and similar lines in aircraft. Clips of the type to which this invention relates form the subject matter of United States Letters Patent No. 2,215,283, issued on September 17, 1940, to Paul W. Adler, and United States Letters Patents No. 2,279,865 and No. 2,279,866, granted to me on the 14th day of April 1942.

Heretofore in this art the clips have been made of a solid or sheet metal conduit-embracing strap, a conduit-embracing cushion of resilient insulation material on the strap, and a metal bonding strip provided in the assembly so as to electrically bond the conduit to the strap. Such straps are resilient but relatively stiff and usually preformed to produce loop portions the ends of which are forcibly sprung apart in order to "snap" the clips on the conduits in the installation thereof.

An object of the present invention is to provide a clip of the type above noted wherein a metallic conduit-embracing strap is subject to being freely flexed and bent by hand, and is highly flexible yet comparatively strong and durable, to the end that the clip as a whole is more readily conformable to the contours of and therefore more closely and effectively grips and holds the conduit in place, also more effectively holds the cushion and bonding elements in proper position; may be installed with greater ease and rapidity without necessitating forcibly springing the ends of the strap apart and the snapping or forcing of the clip on the conduit, thereby avoiding abrading or other impairment of the bonding strip and possible distortion of the clip, and may be more conveniently packed and shipped in straight and substantially flat form subject to being readily bent around the conduit on the job.

Another object of my invention is to provide a clip of the character described which is more rugged, durable, reliable, less likely to cause deformation and weakening of the conduit and not as likely to be rendered unfit for use when "bent" or deformed before installation, as is the case with clips as heretofore made, nor as subject to deformation and other failure after installation, due in the most part to the appreciable strength and high degree of flexibility and "yielding," "cushioning" and close-conforming actions afforded by use of a substantially inert or non-tensioned strap such as one made of metal braid, woven wire, or the like.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clip embodying my invention;

Fig. 2 is a vertical sectional view of the clip shown in Fig. 1;

Fig. 3 is a cross sectional view taken on the line 3—3 of Fig. 2;

Fig. 4 is a horizontal sectional view taken on the line 4—4 of Fig. 2;

Fig. 5 is a side elevation of the strip as when "open" in full lines and in conduit-embracing position in dotted lines, the cushion being removed;

Fig. 6 is a fragmentary perspective view of the clip shown in Figs. 1 to 4 inclusive as when in straight form before being applied;

Fig. 7 is a perspective view of a modified form of clip embodying my invention.

Referring to the drawing more specifically, it is seen that one embodiment of my invention includes a metallic strap 1 which is subject to being freely flexed and bent by hand and is substantially inert or non-tensioned, a cushion 2 of resilient insulation material carried by the strap and adapted to embrace a metal conduit 3, and a flexible metallic bonding strip 4 maintained in the clip for electrically bonding the conduit to the strap.

As shown in Figs. 1 and 2 the apertured ends 5 of the metal strap are secured together and to a metallic structural part 6 of the airplane, by means of a suitable fastening element 7 whereby static electricity will be discharged from the conduit line through the bonding strip and metal strap into the metal structure of the airplane without producing sparks which are dangerous or likely to interfere with efficient operation of the radio equipment of the airplane.

As here provided the substantially inert or non-tensioned metal strap is made of woven wire or metal strands, or in other words, is preferably a braided metallic strap and its ends 5 are preferably made comparatively rigid and apertured. As here shown rigid metal terminal members 8 and 9 are soldered, welded or otherwise secured to the ends 5. These terminal members are provided with reinforcing flanges 10 on their longitudinal edges forming channels or grooves to receive the ends 5 of the strap and assist in holding said ends and terminals properly aligned and connected. The terminal member 8 is of angular form whereas terminal member 9 is straight and adapted to lie against the supporting structure 6 as shown in Figs. 1 and 2. The apertures in the terminal members 8 and 9 register with the apertures in the ends 5 and accommodate the fastening element 7 as shown in Fig. 2.

When the ends 5 with the terminal members 8 and 9 are clamped together as shown in Fig. 2, the flexible braided strap 1 will be constricted and clamp the cushion 2 tightly against the conduit, the angular terminal member 8 abutting the flat terminal member 9 and the latter abutting the structure 6. As the rigid terminal members are substantially inflexible and the strap highly flexible it is seen that the strap will closely conform to the curvatures and contours encountered and likewise hold the compressible cushion in close and secure engagement with the conduit thereby insuring a most reliable contact of the bonding strip with the strap as well as with the conduit regardless of vibratory or other stresses to which the conduit and clip are subjected.

Moreover, due to the inherent flexibility of the strap throughout the greater part of the conduit embracing portion thereof and the fact that it is substantially inert or free from tension before it is installed, the clip as a whole is not as likely to become damaged or rendered unfit for use when it is accidentally subjected to distorting, bending or crushing stresses. The high degree of flexibility of the braided strap and its other characteristics provide for an appreciable yielding and somewhat of a cushioning action after the clip is installed, to dampen vibratory and similar stresses and also prevent such stresses from loosening the clip and tending to effect appreciable relative movement of the parts thereof and consequent bonding and cushioning failure.

The resilient cushion 2 of insulation material may be embodied in the clip in various forms provided it will afford a cushioned seat for the conduit within the strap 1. As here shown the cushion is of channeled cross section having marginal flanges 11 abutting the longitudinal edges of the strap, and flanges 12 extending inwardly from flanges 11 and overlying the strap, thereby holding the cushion in place.

The forwardly projecting limb of the right angular terminal member 8 is extended into the channel of and thereby "covered" by an end portion 2a of the cushion, which is additionally expanded so as to grip within it said limb and be more securely supported thereby. The other end portion 2b has the flanges 12 and the major portion of the flanges 11 cut away, and overlies the inner face of the inner end portion of the terminal member 9. This provides short flanges 11' which form a shallow channel to receive flanges 10 on said terminal member as shown in Fig. 4, thereby holding the terminal member and cushion aligned. This arrangement leaves the outer face of terminal member 9 bared for contact with the structure 6 as shown in Fig. 2.

The flexible bonding strip 4 may be embodied in the clip in any manner provided it is maintained in the assembly in electrical contact with the strap and has a portion disposed on the cushion for contact with the conduit.

As here shown the strip 4 is threaded through transverse slots 14 in the cushion so that portions 4a thereof lie between the strap and cushion in contact with the strap while portions 4b are exposed on the cushion for contact with the conduit.

Fig. 6 shows the clip in straight or flat form as before application, it being possible in view of the flexibility of the braided strap to make the clips in this form and bend them around the conduit on the job at the time of installation thereof. This flat form facilitates packing and shipping of the clips and makes it unnecessary to pre-form the clips.

Although the strap as here employed is preferably substantially inert and non-tensioned due to the fact that these qualities are ordinarily inherent in braided metal or woven wire braid and the like, it should be understood that a somewhat tensioned strap of braided metal or metallic or other material having the flexible and high strength characteristics of metal braid could be used as within the scope of this invention, provided the strap will have a high degree of flexibility and strength and is not inherently stiff and rigid, can be easily and properly bent around the conduit on the job and does not necessitate preforming of a loop portion.

Moreover it should be understood that the strap of my invention, because of its peculiar properties, could be employed advantageously as a clip without the cushion although in its preferred form it is, as here shown, provided with a cushion and a bonding strip.

As shown in Fig. 7 a modified form of my invention is the same as the first described embodiment except that the separate rigid terminal members are omitted. Here the clip embodies a braided strap 15, a cushion 16 and a bonding strip 17 identical with such parts in the first described embodiment. The apertured ends 18 and 19 of the strap are bent to extend tangentially in the same manner as in the first form, then stiffened by being soldered or metal plated or dipped to make them rigid and form-retaining.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a conduit supporting clip, a flexible, substantially inert metal strap made of woven wire and capable of being bent by hand to embrace and conform to a conduit; rigid apertured ends on said strap adapted to be brought together to clamp the strap around a conduit and for securing it to a support; a resilient conduit-embracing cushion carried by said strap; and a metal bonding strip in contact with said strap at a point between the cushion and strap and having a portion exposed on the cushion for contact with said conduit.

2. In a conduit supporting clip, a flexible, substantially inert braided metal strap capable of being bent by hand to embrace and conform to a conduit; rigid apertured terminal members fixed to and overlying the ends of said strap adapted to be brought together for clamping the strap on a conduit and for securing the strap to a support; said members having marginal flanges between which said ends of said strap are mounted and with which the corresponding margins of said ends are engaged.

3. In a conduit supporting clip, a flexible, substantially inert metal strap made of woven wire and capable of being bent by hand to embrace and conform to a conduit; rigid apertured terminal members fixed to the ends of said strap for securing the strap to a support; and a resilient conduit-embracing cushion on said strap having portions embracing the inner end portions of said terminal members.

HERMAN RAY ELLINWOOD.